United States Patent
Nikovski et al.

(10) Patent No.: US 9,305,306 B2
(45) Date of Patent: Apr. 5, 2016

(54) METHOD AND SYSTEM FOR AUTONOMOUSLY DELIVERING INFORMATION TO DRIVERS

(71) Applicant: Mitsubishi Electric Research Laboratories, Inc., Cambridge, MA (US)

(72) Inventors: Daniel Nikolaev Nikovski, Brooklinw, MA (US); Bret Harsham, Newton, MA (US); John Hershey, Winchester, MA (US); Dirk Brinkman, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/463,874

(22) Filed: Aug. 20, 2014

(65) Prior Publication Data

US 2015/0088645 A1    Mar. 26, 2015

Related U.S. Application Data

(63) Continuation-in-part of application No. 14/035,502, filed on Sep. 24, 2013, now Pat. No. 9,170,119, and a continuation-in-part of application No. 14/077,689, filed on Nov. 12, 2013, and a continuation-in-part of application No. 14/198,742, filed on Mar. 6, 2014.

(51) Int. Cl.
| | |
|---|---|
| *G01C 21/10* | (2006.01) |
| *G06Q 30/02* | (2012.01) |
| *G06N 7/00* | (2006.01) |
| *G01C 21/36* | (2006.01) |
| *G06K 9/62* | (2006.01) |

(52) U.S. Cl.
CPC ........ *G06Q 30/0254* (2013.01); *G01C 21/3679* (2013.01); *G06N 7/005* (2013.01); *G06Q 30/0265* (2013.01); *G06K 9/6277* (2013.01)

(58) Field of Classification Search
CPC  G06Q 30/0254; G06Q 30/0265; G06N 7/005
USPC ........................... 701/489; 705/14.52; 706/11
See application file for complete search history.

(56) References Cited

U.S. PATENT DOCUMENTS

| | | | |
|---|---|---|---|
| 6,314,420 B1 | 11/2001 | Lang et al. | |
| 6,775,664 B2 | 8/2004 | Lang et al. | |
| 2005/0125148 A1 | 6/2005 | Van Buer et al. | |
| 2009/0298483 A1 | 12/2009 | Bratu et al. | |
| 2011/0066501 A1 | 3/2011 | Saxena et al. | |
| 2011/0181426 A1 | 7/2011 | Bucciero et al. | |
| 2012/0101903 A1* | 4/2012 | Oh et al. | 705/14.66 |
| 2012/0221413 A1 | 8/2012 | Alberth et al. | |
| 2013/0117105 A1* | 5/2013 | Dyor et al. | 705/14.52 |
| 2013/0166096 A1 | 6/2013 | Jotanovic et al. | |
| 2013/0345957 A1* | 12/2013 | Yang et al. | 701/300 |

\* cited by examiner

*Primary Examiner* — Luke Huynh
(74) *Attorney, Agent, or Firm* — Dirk Brinkman; Gene Vinokur

(57) ABSTRACT

A method delivers information to satisfy current needs of a driver of a vehicle, by first acquiring data related to a current state of the vehicle. The current state and a predictive model are passed to a predictive procedure to determine choice probabilities for nodes in a choice tree (CT). Based on the choice probabilities, information related to the current needs to the driver are selected from a database storing commercial and non-commercial information. Then, the information is delivered to the driver, wherein the delivering is autonomous of the driver.

19 Claims, 3 Drawing Sheets

METHOD AND SYSTEM FOR AUTONOMOUSLY DELIVERING INFORMATION TO DRIVERS

RELATED APPLICATION

This Application claims priority to U.S. application Ser. No. 14/035,502, Method and System for Dynamically Adapting user Interfaces in Vehicle Navigation Systems to Minimize Interaction Complexity, filed by Nikovski et al., on Sep. 24, 1013 now abandoned, U.S. application Ser. No. 14/077,689, "Method for Predicting Travel Destinations Based on Past Data," filed by Hershey et al. on Nov. 12, 2013, and U.S. application Ser. No. 14/198,742, "Actions Prediction for Hypothetical Driving Conditions," filed by Harsham et al., on Mar. 6, 2014, all incorporated herein by reference.

FIELD OF THE INVENTION

The invention relates generally to a method and system for delivering information to a driver of a vehicle, and more particularly to delivering precise and useful information related to a current state associated with the driver and/or vehicle.

BACKGROUND OF THE INVENTION

The main objective of a driver operating a vehicle is to reach a destination safely in a reasonable amount of time. Secondary objectives can include maintaining the condition of the vehicle, and providing comfort and entertainment to passengers. Completing these objectives may require a variety of information, such as information about restaurants, rest areas, hotels, service stations, entertainment establishments, etc.

Typically, there are multiple options, and the options selected by the driver can depend on cost, quality, location, and/or driver preferences. Conventionally, the information is delivered by commercial roadside signs or locally broadcast commercial advertisements, which cannot anticipate any particular driver's preferences or needs.

A much better approach is to target the delivery to a specific consumer. Typically, targeted delivery is achieved by recommendation systems using collaborative or content-based filtering, such as Google AdWords®, Microsoft Bing® Ads. However those recommendation systems were not designed for in-vehicle use. Conventional systems use large database of consumer buying patterns, such as information about previously purchased or used products. Interacting with such online systems can be complex and extremely distracting.

Prior art information delivery typically focus on only commercial advertisements, see U.S. 20120101903, "Apparatus and Method for Mobile Intelligent Advertizing Service Based on Mobile user Contextual Matching," U.S. 20120221413, "Intelligent Presentation of Advertising with Navigation," U.S. 20110066501, "Apparatus and Method for Rendering Advertising Contents on a Mobile Communication Device," and U.S. 20090298483 "Method and Apparatus for Selecting Advertisements and Determining Constraints for Presenting the Advertisements on Mobile Communication Devices."

SUMMARY OF THE INVENTION

The embodiments of the invention provide for a system and method for autonomously delivering commercial and noncommercial information to a driver of a vehicle. The driver can be considered a potential consumer of the information. Specifically, the information relates to goods and services of potential interest to the driver. The method identifies the potential needs, in a form of a probability distribution over a choice tree, and determines what information to deliver. The method is based on the realization that the driver is probably more willing to consider a relatively small amount of relevant information, than to select from numerous undirected roadside signs and broadcast commercials.

DETAILED DESCRIPTION OF THE PREFERRED EMBODIMENTS

The embodiments of the invention provide for a system and method for autonomously delivering information to satisfy current needs of a driver of a vehicle. It should be noted that the information can also be related to other occupants. However, the primary aim is to eliminate driver input to the system.

The information can be in the form of commercial (marketing) information, e.g., advertisements, and unlike prior art system, noncommercial (public service) information, e.g., travel or road conditions, public parking, advertising-free broadcast radio stations, etc.

The method identifies current needs of the driver, and then autonomously delivers information related to products and service that potentially satisfy the current needs. It should be understood that information can be any type of information useful to drivers. It is also understood that commercial and noncommercial information can compete for the driver's attention. As used herein, the term "autonomous" means that the method does not require direct input from the driver by either voice, or typed queries, as in typical prior art systems and methods.

The method is based on the realization that the specification of the needs, in terms of typed or voice input, as in the prior art, is unsafe and/or inaccurate for drivers. The method effectively uses current and past states associated with the driver and/or the vehicle during search and selection procedures for products and services that might be of interest to the driver, so that relevant information can be delivered autonomously to satisfy the current needs of the driver.

For example, the current need can be based on the fact that the driver frequently stops at a local coffee shop operated by a particular chain on work days between 8 a.m. and 9 a.m., while listening to a particular news program. So, if the system detects the event that the driver is in a different locale during the current state, then the system autonomously delivers information related to coffee shops of the same chain while tuning to the driver's favorite news program at the correct time. The driver just drives. As another example, if the vehicle currently needs fuel, or repair, then information about a location of a nearest service station of a brand preferred by the driver can be delivered. Since the delivery of this information is of commercial interest to the providers of the goods and services identified as useful for the driver, advertising revenue is collected from these providers.

Figure 1:
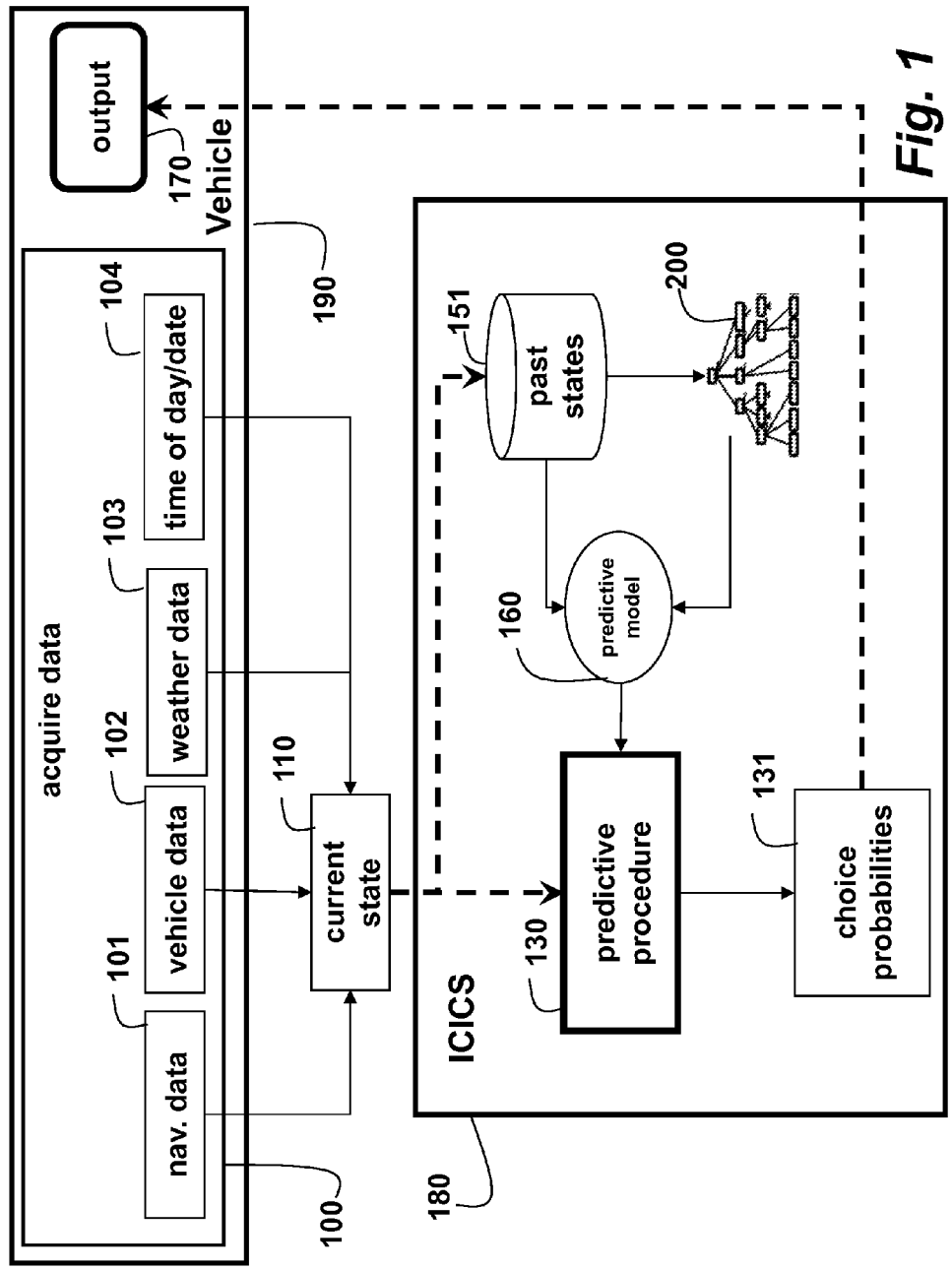
FIG. 1 is a flow diagram of a system and method for delivering information to a driver of a vehicle according to embodiments of the invention.

In order to make this happen, as shown in a FIG. 1, the method acquires data 100. The data acquisition can be continuous and/or periodic. The data can include driver and vehicle related data, e.g., navigation data 101, vehicle bus data 102, e.g., fuel level, velocity, etc., inside and outside weather data 103, time of day and date 104, and forms a current state 110. The current state can be in a form of a vector. The current state is used to update past states 151 in a database. The updating is frequent enough to form a good characterization of current and past states used to maintain nodes in a choice tree (CT) 200 as described below, as well as observed selections of needs.

In one embodiment of the invention, as shown in FIG. 1, the method is performed by a system operated by an in-car information communication system (ICICS) 180 in wireless contact with the vehicle 190. That is the data 200 are transmitted from the vehicle to the ICICS using a wireless communication system. The ICICS maintains the past states, CT, and a predictive model, performs the predictive procedure, and transmits the information to the vehicle based on the choice probability. There can be one CT for each driver and/or vehicle. That is, an identity of the driver or vehicle is transmitted to the ICICS with each current state so the ICICS can select the appropriate CT to operate on.

In another embodiment of the invention, most of the functionality of the ICICS, such as maintenance and updating of the CT, is done locally inside the vehicle, and only the database of available ads is uploaded continuously over a wireless connection.

The current state and the past states are used to maintain a predictive model 160. The predictive model 160 relates the current state and the past states. The predictive model can be learned from the data 100, hand-crafted, or obtained in some other way, e.g., see the related Applications. A predictive procedure 130 uses the predictive model and the current state to determine choice probabilities 131 for nodes in the CT. One example of such a predictive procedure is described in U.S. application Ser. No. 14/035,502, Method and System for Dynamically Adapting user Interfaces in Vehicle Navigation Systems to Minimize Interaction Complexity, filed by Nikovski et al. on Sep. 24, 2013, incorporated herein by reference. The choice probabilities are used to autonomously deliver and present specific information to the driver using an output device 170, e.g., a display screen or loudspeaker, see related applications. In the embodiments, the autonomously delivery is initiated by the current or relatively recent states, and not by the driver interacting with the system as in the prior art.

The method can be performed in one or more processors connected to memories and input/output interfaces as known in the art. The processors can be connected to transceivers for wireless communication.

Figure 2:
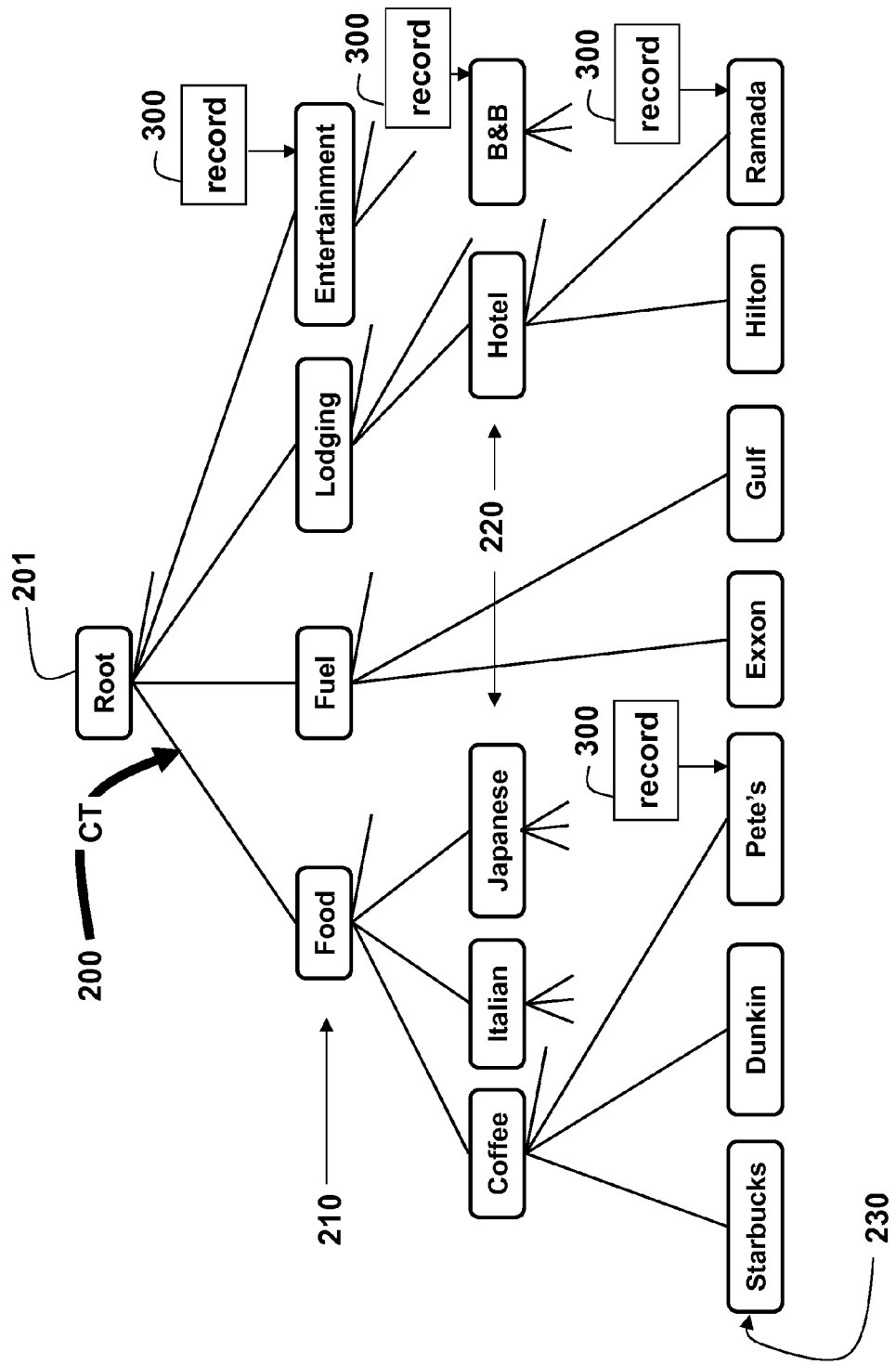
FIG. 2 is an exemplar choice tree used by embodiment of the invention.

As shown in FIG. 2, the possible needs and information about the needs are organized in a choice tree (CT) 200. The CT is organized according to types of products and services the driver may need. The top of the tree is a root node 201. A first intermediate level 210 indicates general needs, e.g., food, fuel, lodging and entertainment. This level can also include needs related to other top level driver needs, such as climate control, map manipulation, etc. Other intermediate level(s) 220 are more specific, e.g., identifying categories of the general needs. The bottom (leaf node) level 230 related to products and services that satisfy specific needs. In other words, the nodes increase in specificity as one moves down the levels of the CT.

One way to determine user needs is described in U.S. application Ser. No. 14/403,502, Method and System for Dynamically Adapting user Interfaces in Vehicle Navigation Systems to Minimize Interaction Complexity, filed by Nikovski et al., on Sep. 24, 2013, incorporated herein by reference. That method adapts a user interface of a vehicle navigation system, based on an input vector representing a current state related to the vehicle. Probabilities of actions are predicted to achieve a next state using a predictive model representing previous states. Then, a subset of the actions with highest probabilities that minimize a complexity of interacting with the vehicle navigation system are displayed in the vehicle.

U.S. application Ser. No. 14/075,939, "Method for Predicting Travel Destinations Based on Historical Data," filed by Hershey et al. on Nov. 8, 2013, and incorporated herein describes a method for determining probabilities of visiting specific locations based on navigation data.

Figure 3:
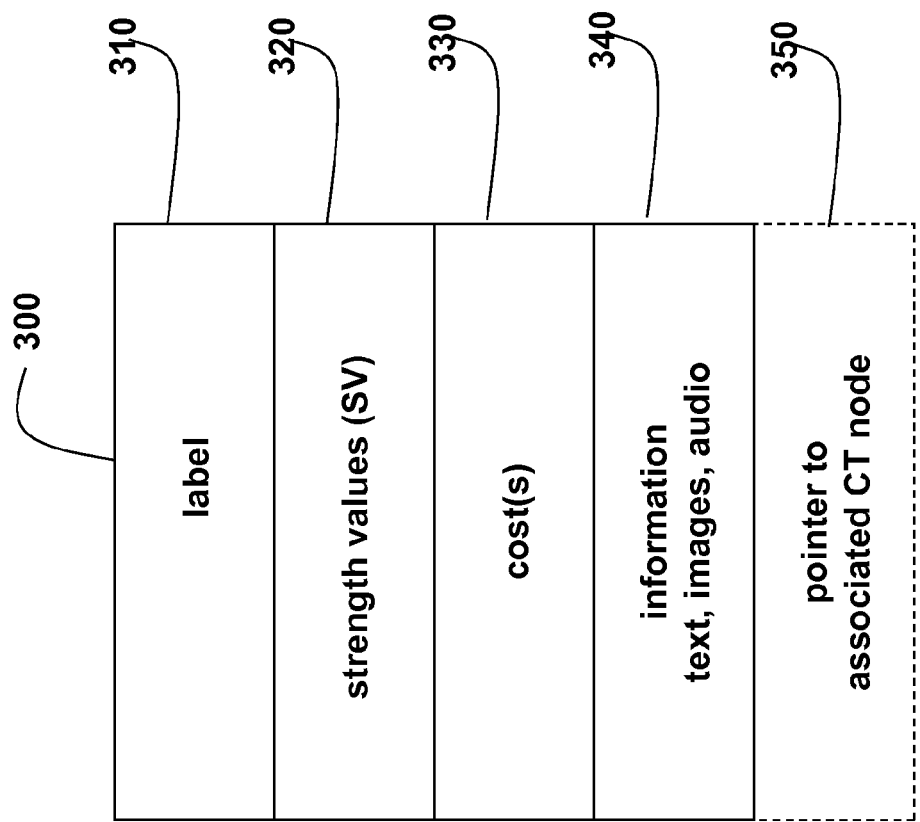
FIG. 3 is a record used by the system and the method according to embodiments.

FIG. 3 shows a format of a record 300 associated with a node in CT. The record includes a label 310, a strength value (SV) 320, a cost 330, information 340 about products or services, e.g., text, images, or audio, video, or music for example, and a pointer 350 to the CT node that this record is associated with. Multiplying the choice probability of the node pointed to by the pointer 350 by the SV 320 will yield an estimate of a relevance of the node for satisfying the current needs of the driver.

Label

The label identifies the product or service at the various levels of the choice tree, e.g., food and lodging at a first level 210, coffee and hotel at an intermediate level 220, and Starbucks and Hilton at bottom level 230 leaf nodes. The label increases in specificity for lower levels of the CT.

SV

The SV indicates how related the information 340 is to associated node. The SV represents the probability that consumers/drivers respond to the information, which probability should be proportional to the likelihood that the information would lead to an outcome that satisfies the identified need. For example, information about a gas station would have a high strength value of association to a node in the CT that corresponds to fuel, because all gas stations would satisfy the need for fuel. In contrast, a gas station would have a lower SV with respect to a CT node that corresponds to food, because not all gas stations sell food, and the need for food would not be satisfied in all cases when the driver stops at a gas station. The exact SV values can be adjusted based on data collected during operation. The SV is initially set to a default value, and can be updated based on the data 100 acquired from many drivers. The selection process uses the current SV to preferentially deliver information to the consumer.

Every time the SVs are updated, the method uses the current probabilities to select the preferred information to be delivered. In one embodiment, the selection process delivers the information associated with a highest SV corresponding to a leaf node with a highest choice probability. This selection maximizes the likelihood that the primary needs of the driver are satisfied and that the driver actually uses the delivered information. For example, if the system has identified that the driver needs coffee at the current moment, then the information that is most relevant to coffee from the entire database would be selected.

In other embodiments, the information that is delivered to the driver maximizes a product of the SV, the cost, and the choice probability of one of the nodes whose label is associated with the information This delivery strategy is intended to maximize revenue for the ICICS.

Cost

As used herein, the term "cost" is interpreted broadly as, e.g., a monetary value, a positive or negative incentive, or an arbitrary metric derived from some cost function. In one embodiment, the cost expresses an amount a provider of goods and services is willing to pay the ICICS for delivering the information. The condition for payment can be, e.g., cost per impression(s) (CPI) or cost per thousand impressions (CPM), i.e., the number of times the information has been delivered to a consumer, or a cost per "click" (CPC), that is, the number of times the information has actually been used, although in the system according to embodiments of the invention there is no actual "clicking." When the CPC is used, a coupon code can be delivered along with the information. When the coupon code is used at a provider, the use of the information can be certified, and the consumer can be awarded accordingly. The ICICS can also transmit the coupon code to a mobile device, e.g., a cellular telephone or tablet computer, for convenience of later use outside of the car.

The method can monetize an improved efficiency by an auction where providers bid on labels at higher levels in the CT, such as "Food", "Fuel," or "Hotel." In an auction of this type, the costs of information at all levels are determined as a product of the CPC bidding price and their relevance.

Unlike AdWords®, the relevance of information is estimated to be the choice probability for the CT with which the information is associated. In this information selection mechanism, only one CT node is associated with the information, although the same information can be included in multiple records, each record associated with a different CT node, and possibly a different cost.

After the probabilities for all records are determined, the information in the record with the highest choice probability is delivered, and the amount the provider is willing to pay is determined as the second-highest choice probability, divided by a relevance of the highest choice probability, plus a small fixed amount, for example $0.01. This mechanism selects information that is relevant to the consumer, and also minimizes the cost providers pay in non-competitive situations. This can be a significant incentive for providers of goods and services to join the ICICS.

Another selection process allows providers to bid on CT nodes and on logical conditions related to belief values associated with the information, e.g., when the information is to be displayed. Continuing the above coffee example, two coffee providers, for example, Starbucks and Dunkin Donuts in the leaf nodes, can bid $0.03 and $0.02 on the second level node [Coffee]. In addition, Dunkin Donuts can bid $0.05 on a logical condition where the choice probability of the node [Coffee] is higher than 0.7, and the choice probability of the child node [Starbucks] is higher than that of the sibling node [Dunkin Donuts]. That is, a provider can bid more for the privilege to show its information when the driver's need for its product has been identified, but it is also believed that the driver may go to a competitor. In that case, different information, for example, information offering a larger discount, can be delivered with the hope of attracting the consumer. When multiple advertisements match a logical condition, either the information in the node with the highest cost can be used, or an auction can be performed.

Moreover, when two or more providers bid for the same node, then the cost to deliver the information can be based on the bidding amounts and the current location of the vehicle. For example, if Starbucks, Dunkin Donuts, and Pete's Coffee bid $0.03, $0.02, and $0.01 on the node "Coffee", but only Dunkin Donuts and Pete's Coffee are convenient choices at the current time, Dunkin Donut's information is delivered, and not Starbucks's. This is equivalent to attaching another logical condition to the above described scheme, such that the condition is true when the provider can be reached within a specified time lime. This time limit can be user specific.

The SV can be updated for all drivers who interact with the CT. The main source of information about positive association are successful redemptions of coupon codes. Lack of such redemptions, within a specific period of showing the information to the driver, can be taken as indicators of negative association between nodes in the CT and the information. Furthermore, indicators of negative association can be given more directly, by means of a "thumbs down" button available with the displayed information, which enables the driver to reject the product or service delivered. The corresponding SV can be decreased significantly, so that the information is less likely to be delivered when the choice probability of the CT node increases.

The method can also be used for planning trips, U.S. application Ser. No. 14/198,742, "Actions Prediction for Hypothetical Driving Conditions," filed by Harsham et al., on Mar. 6, 2014, and incorporated herein, describes a prediction engine for predicting an action based on a set of driving state parameters, and a driving history, and a simulation engine for generating a corresponding hypothetical scenario before the trip. After the driver selects a start and destination for the trip, along with the date and time of the trip, the trip planning tool can use the method according to the invention to identify the needs of the driver en route, and prepare a list of information that can satisfy the needs, along with a set of personalized coupons for the driver to use during his/her future trip. Presumably, such a personalized coupon set would be much more valuable and efficient to use than the generic coupon books distributed by local tourist associations.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for delivering information to satisfy current needs of a driver of a vehicle, comprising:
acquiring data related to a current state of the vehicle, wherein the data includes navigation data from a vehicle navigation system, vehicle data from a vehicle bus weather data, and time of day and date;
passing the current state and a predictive model to a predictive procedure to determine choice probabilities for nodes in a choice tree (CT);
selecting, based on the choice probabilities, information related to the current needs to the driver from a database storing commercial and non-commercial information, wherein the needs are products and services, wherein the database includes records, wherein each record includes a label, a pointer to an associated node in the CT, a strength value (SV) of an association to the node, a cost, and the information; and
delivering the information to the driver, and wherein the delivering is autonomous of the driver without any input of the driver, wherein the delivering is via an output device, and wherein the method is performed in one or more processors.

2. The method of claim 1, wherein the information is associated with a node having a highest choice probability.

3. The method of claim 1, wherein the acquiring, passing, selecting and delivering is performed by an in-car information communication system (ICICS) connected to the vehicle by a wireless communication system.

4. The method of claim 3, wherein the information includes commercial information in a form of ads for products and services, and vendors of the products and services pay operators of the ICICS for delivering the information to the driver.

5. The method of claim 1, wherein the information includes noncommercial information.

6. The method of claim 1, wherein the choice probabilities identify the current needs of the driver.

7. The method of claim 1, wherein the information is presented to the driver on an output device.

8. The method of claim 1, wherein the acquiring, updating, passing, selecting and delivering is initiated only by the current or relatively recent states.

9. The method of claim 1, wherein the nodes are organized in the CT according to types of products and services for satisfying the needs, wherein the CT includes a root node, intermediate level nodes of general needs, and leaf nodes related to products and services that satisfy specific needs.

10. The method of claim 1, wherein the information is associated with a logical condition on when the information is to be displayed.

11. The method of claim 1, further comprising:
multiplying the choice probability by the SV to yield an estimate of a relevance of the node for satisfying the current needs of the driver.

12. The method of claim 1, wherein the SV represents a probability that the driver responds to the information.

13. The method of claim 1, wherein the information that is delivered to the driver maximizes a product of the SV, the cost, and the choice probability to maximize revenue for an in-car information communication system (ICICS).

14. The method of claim 13, wherein the cost expresses an amount a provider of the goods and the services is willing to pay the ICICS for delivering the information.

15. The method of claim 14, wherein a condition for payment is based on a cost per impression.

16. The method of claim 1, further comprising:
delivering a coupon code with the information to certify use of the information.

17. The method of claim 1, wherein the cost is determined by an auction.

18. The method of claim 1, further comprising:
planning a trip using the method.

19. A system for delivering information to satisfy current needs of a driver of a vehicle, comprising:
a vehicle navigation system;
a vehicle bus, wherein the vehicle navigation system and the vehicle system bus are configured to acquire data related to a current state of the vehicle;
a processor, connected to the vehicle navigation system and the vehicle system bus, configured to pass the current state and a predictive model to a predictive procedure to determine choice probabilities for nodes in a choice tree (CT), to select, based on the choice probabilities, information related to the current needs to the driver from a database storing commercial and noncommercial information, wherein the needs are product and services, wherein the database includes records, wherein each record includes a label, a pointer to an associated node in the CT, a strength value (SV) of an association to the node, a cost, and the information; and
an output device, connected to the processor, to deliver the information to the driver, and wherein the delivering is autonomous of the driver without requiring any input of the driver.

* * * * *